United States Patent
Johnsson et al.

(10) Patent No.: US 11,281,518 B2
(45) Date of Patent: Mar. 22, 2022

(54) METHOD AND SYSTEM FOR FAULT LOCALIZATION IN A CLOUD ENVIRONMENT

(71) Applicant: Telefonaktiebolaget LM Ericsson (publ), Stockholm (SE)

(72) Inventors: Andreas Johnsson, Uppsala (SE); Christofer Flinta, Stockholm (SE); Farnaz Moradi, Stockholm (SE); Jawwad Ahmed, Kista (SE); Rafael Pasquini, Uberlandia (BR); Tim Josefsson, Uppsala (SE); Rolf Stadler, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 241 days.

(21) Appl. No.: 16/488,347

(22) PCT Filed: Feb. 22, 2018

(86) PCT No.: PCT/SE2018/050174
§ 371 (c)(1),
(2) Date: Aug. 23, 2019

(87) PCT Pub. No.: WO2018/156076
PCT Pub. Date: Aug. 30, 2018

(65) Prior Publication Data
US 2020/0012549 A1   Jan. 9, 2020

Related U.S. Application Data

(60) Provisional application No. 62/463,187, filed on Feb. 24, 2017.

(51) Int. Cl.
*G06F 11/00*   (2006.01)
*G06F 11/07*   (2006.01)
(Continued)

(52) U.S. Cl.
CPC ........ *G06F 11/079* (2013.01); *G06F 11/0751* (2013.01); *G06N 20/00* (2019.01); *H04L 67/10* (2013.01)

(58) Field of Classification Search
CPC ... G06F 11/079; G06F 11/0751; G06N 20/00; H04L 67/10
See application file for complete search history.

(56) References Cited

U.S. PATENT DOCUMENTS 5,584,291 A * 12/1996 Vapola ................. A61M 16/104
600/301
7,440,857 B2 * 10/2008 Morel ................... B64C 27/001
702/35

(Continued)

OTHER PUBLICATIONS

International Search Report and Written Opinion for Application No. PCT/SE2018/050174, dated Mar. 3, 2018, 10 pages.

(Continued)

*Primary Examiner* — Jonathan D Gibson
(74) *Attorney, Agent, or Firm* — NDWE LLP

(57) ABSTRACT

A method for predicting a location of a fault in a system is described. The method includes obtaining a faulty unit pertaining to a Supervised Self-Organizing Map (SSOM), wherein the faulty unit has been derived from a sample of machine-level metrics for the system and the SSOM has been trained with a first layer of machine-level metrics and a second layer of service-level metrics. The method further includes expanding a circle originating at the faulty unit until a number of normal units of the SSOM falls within the circle, computing, for each machine-level metric, a score based on differences between the faulty and normal units, wherein a set of scores comprises the respective score for each machine-level metric, and selecting a sub-set of the set, wherein the sub-set comprises the greatest scores of the set, (Continued)

whereby the fault is predicted as located according to metrics represented by the sub-set.

20 Claims, 11 Drawing Sheets

(51) Int. Cl.
*G06N 20/00* (2019.01)
*H04L 67/10* (2022.01)

(56) References Cited

U.S. PATENT DOCUMENTS

| | | | | |
|---|---|---|---|---|
| 9,304,796 | B1* | 4/2016 | Douglas | G06F 11/0712 |
| 2001/0039481 | A1* | 11/2001 | Tremblay | H01M 8/04365 |
| | | | | 702/35 |
| 2004/0103070 | A1* | 5/2004 | Joseph | G06F 16/35 |
| | | | | 706/12 |
| 2008/0114553 | A1* | 5/2008 | Morel | B64C 27/001 |
| | | | | 702/35 |
| 2014/0258791 | A1* | 9/2014 | Kew | G06F 11/0751 |
| | | | | 714/49 |
| 2015/0227404 | A1* | 8/2015 | Rajagopal | G06F 11/0784 |
| | | | | 714/37 |
| 2016/0203036 | A1* | 7/2016 | Mezic | G06F 11/079 |
| | | | | 714/819 |
| 2018/0060150 | A1* | 3/2018 | Cunico | G06F 11/079 |
| 2019/0121350 | A1* | 4/2019 | Cella | H04L 67/12 |
| 2019/0324434 | A1* | 10/2019 | Cella | G06N 3/088 |
| 2021/0019215 | A1* | 1/2021 | Neeter | G06Q 10/063112 |

OTHER PUBLICATIONS

Ahmed J., et al., "Predicting SLA Violations in Real Time using Online Machine Learning," ArXiv, Sep. 2015, 8 pages.

Dean D.A., et al., UBL: Unsupervised Behavior Learning for Predicting Performance Anomalies in Virtualized Cloud Systems, ICAC '12 Proceedings of the 9th International Conference on Autonomic Computing, Sep. 18-20, 2012, pp. 191-200.

Hastie T., et al., The Elements of Statistical Learning: Data Mining, Inference, and Prediction, Second Edition, Feb. 2009, 764 pages.

Kohonen T., "The Self-Organizing Map," Proceedings of the IEEE, vol. 78, No. 9, Sep. 1990, pp. 1464-1480.

Wehrens R., et al., "Self- and Super-organizing Maps in R: The kohonen package," Journal of Statistical Software, vol. 21, Issue 5, Oct. 2007, 19 pages.

Yanggratoke R., et al., "Predicting Real-time Service-level Metrics from Device StatistiMaycs," 2015 IFIP/IEEE International Symposium on Integrated Network Management (IM2015), Jul. 2015, pp. 414-422.

Communication pursuant to Article 94(3) EPC for EP Application No. 18708235.9, dated Jan. 25, 2022, 4 pages.

* cited by examiner

METHOD AND SYSTEM FOR FAULT LOCALIZATION IN A CLOUD ENVIRONMENT

CROSS-REFERENCE TO RELATED APPLICATIONS

This application is a National stage of International Application No. PCT/SE2018/050174, filed Feb. 22, 2018, which claims priority to U.S. Application No. 62/463,187, filed Feb. 24, 2017, which are hereby incorporated by reference.

TECHNICAL FIELD

Embodiments herein relate to computer systems, such as networks of computers, cloud systems, data centers and the like. In particular, a method and a fault localization system for predicting a location of a fault in a computer system are disclosed. A corresponding computer program and a computer program carrier are also disclosed.

BACKGROUND

Many computer-based services are today running in the cloud, where the service quality can vary over time. Real-time service assurance is needed for the service providers to ensure high service quality, such as low latency, to their customers. A service assurance system must be able to detect and localize the problems that may violate the agreed service quality. This is a complex task already in legacy systems and will become even more challenging when executing the services in the cloud. Particularly this is important that service assurance system be able to diagnose the detected problem.

One promising approach to service assurance is based on machine learning, where the service quality and behavior is learned from observations of the system. The ambition is to do real-time predictions of the service quality and in case of service quality degradation or Service Level Agreement (SLA) violations do root cause analysis or cause inference so that mitigation actions can be taken to remedy the detected faults and restore the violated service as soon as possible to minimize the impact of potential penalties from SLA violations.

Machine learning has been used in the past to build prediction models for service quality assurance. For example, predicting user application Quality-of-Service (QoS) parameters, quality-of-experience (QoE), and SLA state for complex telecom environments.

Prediction of user application QoS parameters is disclosed in "Predicting real-time service-level metrics from device statistics", to R. Yanggratoke, J. Ahmed, J. Ardelius, C. Flinta, A. Johnsson, D. Gillblad, and R. Stadler, in Integrated Network Management (IM), 2015 IFIP/IEEE International Symposium, Institute of Electrical and Electronics Engineers (IEEE), 2015.

SLA statistic modelling for complex telecom environments is disclosed in "Predicting SLA Violations in Real Time using Online Machine Learning" to Ahmed, Jawwad, et al., in arXiv preprint arXiv: 1509.01386 (2015).

The key idea is to use some sample data for training a statistical model that can generalize well, which is then used for predictions of unseen data. This work builds on this proven predictive analytics technique to detect the faults or SLA violations in the system to trigger an alarm and couple it with a fault localizer system to pinpoint the faulty machine, VM, metrics etc. in a time interval in which the fault has occurred.

Machine learning refers to the task of predicting unseen samples based on the currently available examples using statistical learning techniques. Predictions can broadly be categorized into a classification problem or regression problem. Document "The elements of statistical learning", to T. Hastie, R. Tibshirani, J. Friedman, and R. Tibshirani, in Vol. 2, no. 1. New York: springer, 2009 disclosed regression problems. This document is herein referred to as "the regression document". Machine learning methods can in general also be categorized as either supervised or unsupervised. For supervised learning the labeled input data is accompanied with expected output while unsupervised learning takes unlabeled data as input. Many classical statistical and Machine Learning (ML) methods fall into supervised learning methodology.

Logistic regression, see "the regression document", is a common method for solving classification problems. It specifies the log-odds posterior probability for the classes and takes positive or negative real numbers as input, while output values are either zero or one. It can hence be interpreted as the posterior probability of drawing a sample from the respective class. The coefficients of the model can efficiently be trained using stochastic gradient decent (SGD) which makes it suitable for online applications. An online version is the Gradient Ascent Logistic Regression.

Another family of classifiers is decision trees, where the feature space is split into a set of regions based on one or more homogeneity criteria recursively until there is no more significant gain in terms of homogeneity of the members of each class. The benefit of decision trees over linear methods is that they perform well even when the inherent relationship between the predictors and the response variable is non-linear. And non-parametric property means that no assumptions are made on the form or shape of the true underlying function. The cost of making a decision is dependent on the height of the tree which is logarithmic in the size of tree.

Decision trees are flexible and have low bias but may lead to high variance in predictions in many cases. However, studies have shown that their effectiveness can be significantly increased when used as a base component for the ensembles such as bagging or random forest. Reference is again made to "the regression document".

SOMs (Self-Organizing Maps) is concept known for its powerful visualization capabilities as explained in e.g. "The self-organizing map." Proceedings of the IEEE 78.9 (1990): 1464-1480, Kohonen, Teuvo. Main property of the SOMs is that very high dimensional data can be transformed in low dimensional space (usually 2 dimensions), which opens up possibilities for dimensionality reductions as an alternative to Principal Component Analysis (PCA), see FIG. 1, but also this way of visualization makes it easy to comprehend data in low dimensions for human analysis. Utility of SOMs is also greatly enhanced because of the topological properties so that units in a SOM map that are close to each other are more likely to have similar data mapped to them (based on a defined similarity measure). However, apart from the traditional strengths of SOM for visualization and dimensionality reduction they can also be used for very effective predictive modeling as described in "Ubl: Unsupervised behavior learning for predicting performance anomalies in virtualized cloud systems", Dean, Daniel Joseph, Hiep Nguyen, and Xiaohui Gu, Proceedings of the 9th international conference on Autonomic computing. ACM, 2012. Not only that but high transparency and interpretation properties of SOMs means that they can also be used for automated Root Cause Analysis (RCA) applications. Automated RCA is a critical feature required in modern Data Center (DC) environments where complexity is growing rapidly.

In Supervised SOMs (SSOMs or also called 2-layer SOMs) in contrast to the traditional SOMs (1-layer), there are 2 layers to map the data. During the training phase the input X data is mapped to layer 1 and label data is mapped to layer 2. However, the same unit in terms of coordinates is selected on both layers using a lowest weighted distance calculation as described in e.g. a package by Kohonen.

Existing solutions for anomaly detection and root-cause analysis have limitations (in terms of accuracy and computation requirements) in the way they attempt to do detection and localization. Some existing solutions are simplistic and only employ some threshold mechanisms on the performance metrics data collected and detect the faults. Other methods deploy the predictive analytics for fault detection but fault localization is still done manually. Then there are methods which deploy the analytics based techniques but require specialized models to be developed for different type of faults and/or load scenarios. Some of them only use of part of the training data (for normal service operation) but discard the rest of the data (do not use for learning) collected when service is in degraded performance state.

SUMMARY

An object may therefore be how to improve fault localization in computer systems, such as computer systems of the above mentioned kind. The object may also be expressed as how to overcome at least some of those disadvantages mentioned above.

The object is achieved by a method and system for training a high quality SSOM model and then use it for detecting and especially for localizing the faults in a DC/Cloud environment with high accuracy and low overhead.

According to an aspect, the object is achieved by a method, performed by a fault localization system, for predicting a location of a fault in a computer system. The fault localization system obtains a faulty unit pertaining to a SSOM. The faulty unit has been derived from a sample of machine-level metrics relating to the computer system. The SSOM has been trained with a first layer of machine-level metrics and a second layer of service-level metrics. The trained SSOM includes at least one faulty unit and at least one normal unit. The fault localization system expands a radius of a circle originating at the faulty unit until a predefined number of normal units of the SSOM falls within the circle. The fault localization system computes, for each machine-level metric, a respective score based on differences between the faulty unit and the predefined number of normal units. A set of scores comprises the respective score for each machine-level metric. The fault localization system selects a sub-set of the set of scores. The sub-set comprises a number among the greatest scores of the set of scores, whereby the location of the fault is predicted to be located to one or more machine-level metrics represented by the sub-set of scores.

According to another aspect, the object is achieved by a fault localization system configured for predicting a location of a fault in a computer system. The fault localization system is configured for obtaining a faulty unit pertaining to a SSOM. The faulty unit has been derived from a sample of machine-level metrics relating to the computer system. The SSOM has been trained with a first layer of machine-level metrics and a second layer of service-level metrics. The trained SSOM includes at least one faulty unit and at least one normal unit. The fault localization system is configured for expanding a radius of a circle originating at the faulty unit until a predefined number of normal units of the SSOM falls within the circle. The fault localization system is configured for computing, for each machine-level metric, a respective score based on differences between the faulty unit and the predefined number of normal units. A set of scores comprises the respective score for each machine-level metric. The fault localization system is configured for selecting a sub-set of the set of scores. The sub-set comprises a number among the greatest scores of the set of scores, whereby the location of the fault is predicted to be located to one or more machine-level metrics represented by the sub-set of scores.

According to further aspects, the object is achieved by a computer program and a computer program carrier corresponding to the aspects above.

In one example, the fault localization system uses SSOM to localize faults based on a dissimilarity measure of a faulty Best Matching Unit (BMU) metrics from the metrics of normal neighboring units. However, it relies on the unit states established during the training phase. For the localization method to work effectively during the training phase higher weights may be used for the X layer and Y layer data labels may be exploited to establish unit states. Having built the fault localization method around SSOM makes it possible to use all of the available training data—all data sample representing both normal and abnormal states including their labels.

An advantage may be that very good fault detection and localization accuracy on several performance fault types may be achieved. A reason for this may be that SSOMs makes it possible to have a much faster training phase, e.g., no need to compute distances to all the faulty neighbors, and high accuracy in detection and localization phases of faults as compared to the unsupervised SOM technique which do not make use of the data labels, such as the second layer of service-level metrics.

Another advantage according to some embodiments may be that the embodiments are highly scalable, since different types of faults are detected as well as localized using one and the same general purpose SSOM model, i.e. the same model is used for two or more fault types after training.

According to some examples, a yet other advantage may be that a low time complexity of training supervised SOM map for detection and localization is achieved.

A yet further advantage is that all training data is used, i.e. in contrast to prior art which uses only the "normal" data from the input and discarding the rest during the training phase.

In some further embodiments, an advantage may be that there is no need to train separate (specialized) models for each different type of fault.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
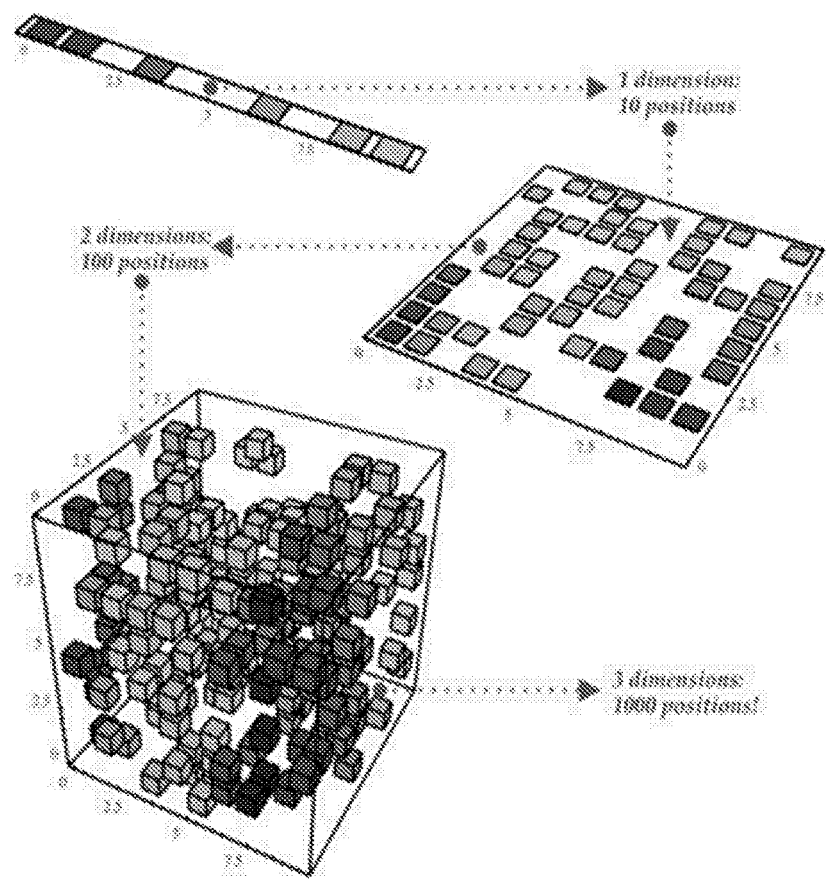
FIG. 1 is a schematic overview of an exemplifying multi-layer SOM.

Throughout the following description, similar reference numerals have been used to denote similar features, such as nodes, actions, modules, circuits, parts, items, elements, units or the like, when applicable. In the Figures, features that appear in some embodiments are indicated by dashed lines.

FIG. 1 generally illustrates that a SOM in 1 dimension may have 10 positions, each having a respective state, e.g. grey scale. Likewise, a SOM in 2 dimensions may have 100 positions, each having a respective state. Similarly, a SOM in 3 dimensions may have 1000 positions, each having a respective state. In this fashion, SOMs may reduce multivariate data in to states.

Figure 2:
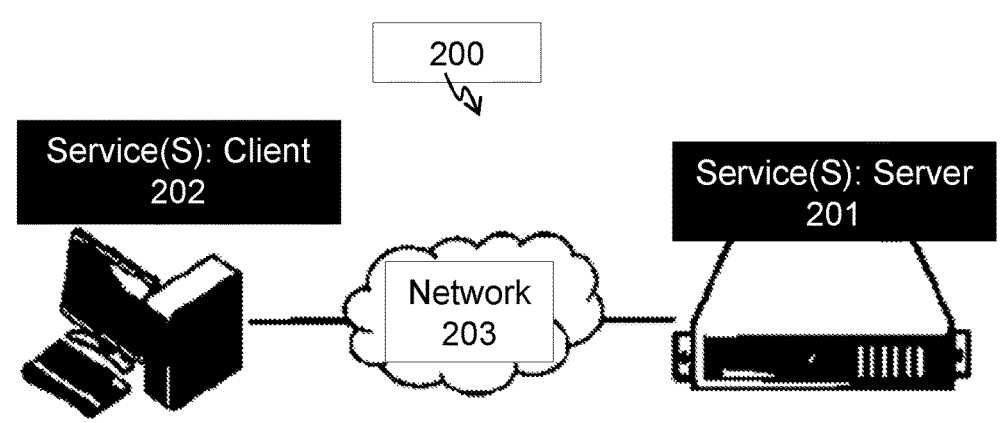
FIG. 2 is a further schematic overview of a system in which embodiments herein may be implemented.

FIG. 2 illustrates a system 200 comprising a set of DC servers 201 and a set of clients 202, which may be interconnected by a network 203. A client accesses a service S which executes on one or several of the DC servers 201. Machine statistics $X_i$, or machine-level metrics X, are collected on each DC server i. The machine statistics are obtained from the kernel of a Linux operating system that runs on one of the servers 201. It gives applications access to resources, such as Central Processing Unit (CPU), memory, and network, and also detailed information about interrupts, number of running processes, and rate of context switches etc. Note that this solution is not limited to the use of kernel statistics from Linux. Similar data can be used from other operating systems, hypervisors or monitoring solutions.

In contrast, service-level metrics Y on the client side 202 refer to statistics on the application level, for example, video frame rates for a video service or response time for a database service. However the concept described below is not limited to these two types of service-level metrics.

The metrics X and Y evolve over time, influenced, e.g., by the load on the server, and operating system dynamics. The evolution of the metrics X and Y can be modeled as time series $\{X_t\}$, $\{Y_t\}$ and $\{(X, Y)\}_t$.

It is possible to predict service-level metrics $Y_t$ on the client side based on knowing the server metrics $X_t$ using the method of statistical learning, and the problem is finding a learning model M: $X_t \rightarrow Y_t$. Assume that a Service Level Agreement (SLA) has been defined and computed for the client side service metrics. The SLA at a given time can either be in a 'violated' or 'not violated' state based on the service metric values. That is, for each service metric $Y_t$ at time t an $SLA_t$ value may be computed. Then it is possible to predict application level SLA conformance for clients based on X, under the assumption that the underlying distribution D may not change over time.

Once a fault, or violation, is detected then the fault localization phase is responsible to identify the problematic metric(s) in the system. A Fault Localizer uses the supervised SOMs to find the faulty metrics once a fault event is generated by the Fault Detector (FD).

Figure 3:
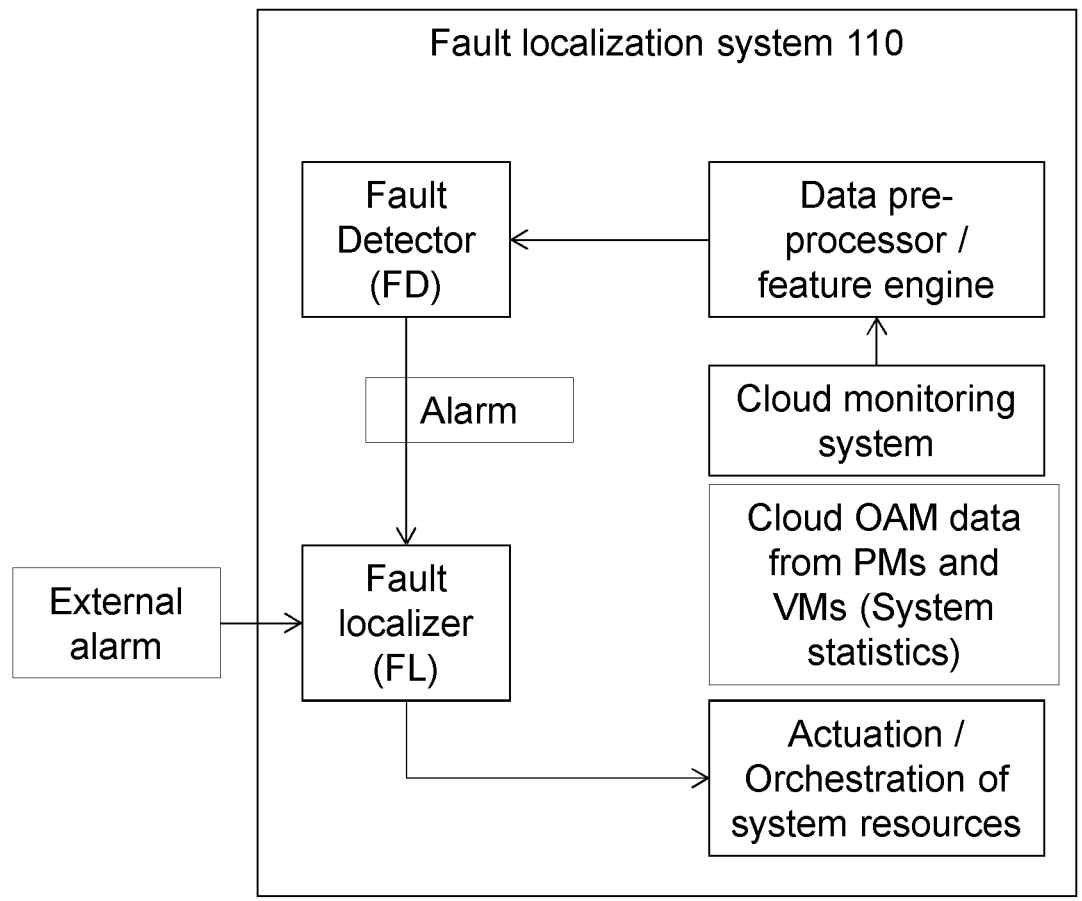
FIG. 3 is a more detailed overview illustrating a method herein.

A high level simplified block diagram of an analytics based service assurance system is shown in FIG. 3 to show components of a fault localization system 110. It shows the overall system architecture where the Cloud/DC monitoring system collects the data from the infrastructure both the system data as well as operational service data e.g., using system activity report (SAR). Data is then cleansed, normalized and smoothed at the 'Data Pre-processor' module also including feature engineering. The Fault Detector (FD) sub-system uses predictive analytics techniques to detect any potential faults in the system. This is discussed in "Predicting real-time service-level metrics from device statistics", R. Yanggratoke, J. Ahmed, J. Ardelius, C. Flinta, A. Johnsson, D. Gillblad, and R. Stadler, in Integrated Network Management (IM), 2015 IFIP/IEEE International Symposium, Institute of Electrical and Electronics Engineers (IEEE), 2015, "Predicting SLA Violations in Real Time using Online Machine Learning", Ahmed, Jawwad, et al., in arXiv preprint arXiv: 1509.01386 (2015), as well as "the regression document". In case a fault is detected then an alarm is generated towards the 'Fault Localizer' (FL) module. An alarm filtering mechanism can optionally be turned-on to further reduce the false alarm rate. Note that an alarm can also be generated from an external source (e.g., some other fault detection method, SLA feedback) as depicted in FIG. 3. In such a case FL can be directly invoked.

The proposed method of fault localization includes a specific way of building and then using that ML model in FD and FL phases of the system.

Figure 4:
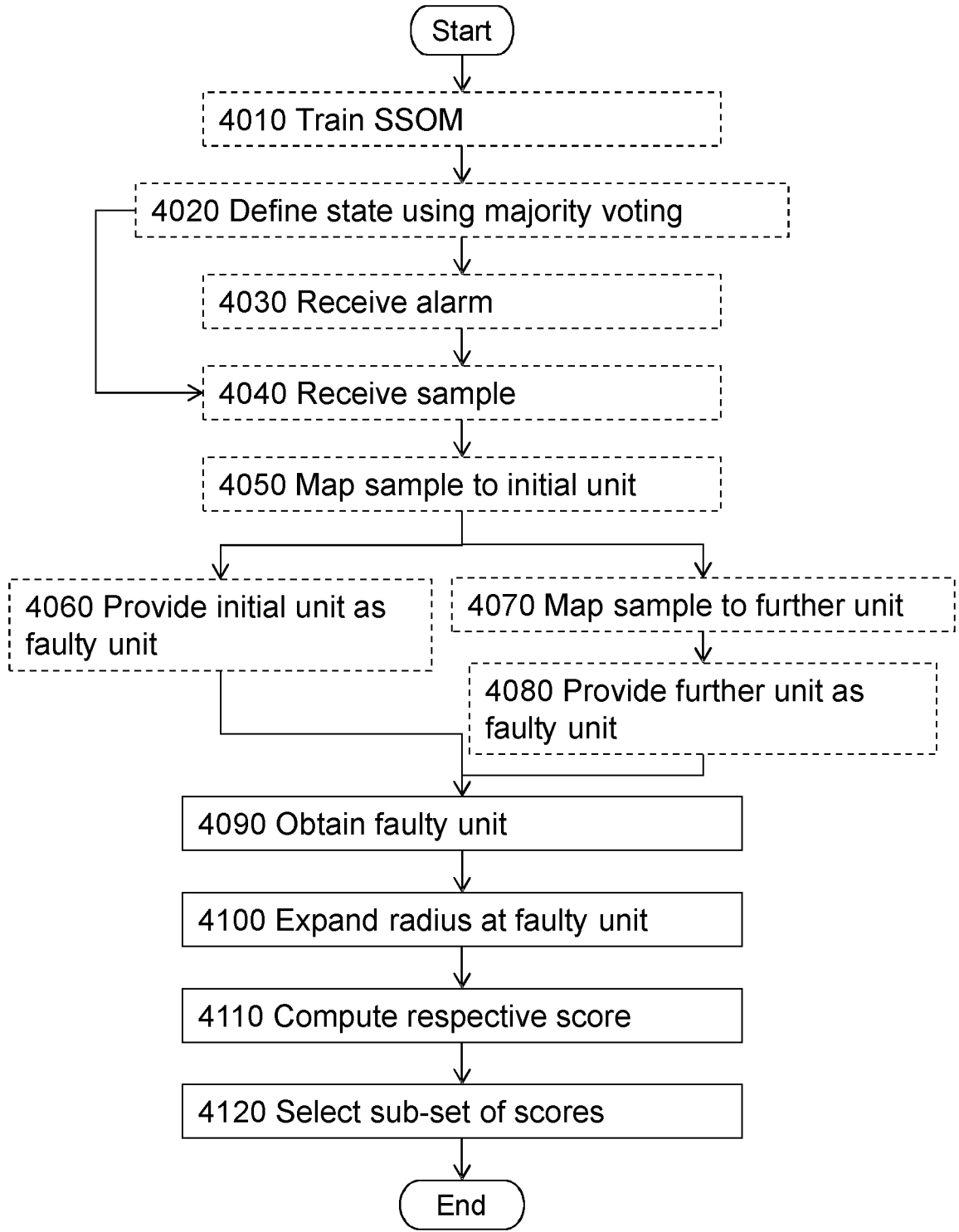
FIG. 4 is a flowchart illustrating embodiments of the method in the fault localization system.

FIG. 4 illustrates an exemplifying method according to embodiments herein when implemented in the system 200 of FIG. 2. The fault localization system 110 performs a method for predicting a location of a fault in the computer system 200. Another exemplifying method will also be described with reference to FIG. 5 below.

One or more of the following actions may be performed in any suitable order.

Action 4010

In order to learn the SSOM to identify faulty units, the fault localization system 110 may train the SSOM with the first layer X of machine-level metrics and the second layer Y of service-level metrics.

Action 4020

Thus, in order to evaluate the service-level metrics, the fault localization system 110 may define a respective state of each unit of the SSOM as faulty or normal using, i.e. by means of, majority voting on the second layer Y of service-level metrics. The respective state of said at least one faulty unit is faulty and the respective state of said at least one normal unit is normal.

When the SSOM has been trained, it may be used to localize a predicted fault and/or a real fault, e.g. in the form of an alarm. In case of the predicted fault, action A4040, action A4050 and action 4060 may be performed. In case of the real fault, in addition to the just mentioned actions, action A4070 and action A4080 may be performed.

Action 4030

Accordingly, in case of a real fault, the fault localization system 110 may receive an alarm relating to degradation of at least one of the service-level metrics.

Action 4040

For both the real fault and the predicted fault, the fault localization system 110 may receive the sample of machine-level metrics relating to the computer system 200. Notably, the sample may be associated with the alarm in case of the real fault.

Action 4050

Again, for both the real fault and the predicted fault, the fault localization system 110 may map the sample to an initial unit of the SSOM.

Action 4060

When a state of the initial unit indicates a fault, the fault localization system 110 may provide the initial unit as the faulty unit. This action may also be performed in both cases, i.e. for the real fault and the predicted fault.

Action 4070

In case of the real fault, it may happen that the initial unit isn't a faulty unit. Hence, when the state of the initial unit indicates a normal state, the fault localization system 110 may map the sample to further units being in a nearest surrounding of the initial unit.

Action 4080

Further, in case of the real fault and subsequent to action 4070, when the state of one of the further units indicates a fault, the fault localization system 110 may provide said one of the further units as the faulty unit.

Action 4090

The fault localization system 110 obtains a faulty unit pertaining to a SSOM. The faulty unit has been derived, e.g. by means of the SSOM, from a sample of machine-level metrics relating to the computer system 200. The SSOM has been trained with a first layer X of machine-level metrics and a second layer Y of service-level metrics. The trained SSOM includes at least one faulty unit and at least one normal unit.

Action 4100

The fault localization system 110 expands a radius of a circle originating at the faulty unit until a predefined number Q of normal units of the SSOM falls within the circle.

Action 4110

The fault localization system 110 computes, for each machine-level metric, a respective score based on differences between the faulty unit and the predefined number Q of normal units. A set of scores comprises the respective score for each machine-level metric.

Action 4120

The fault localization system 110 selects a sub-set of the set of scores. The sub-set comprises a number k among the greatest scores of the set of scores, whereby the location of the fault is predicted to be located to one or more machine-level metrics represented by the sub-set of scores.

In this manner, the fault is estimated to be localized within the sub-set.

Figure 5:
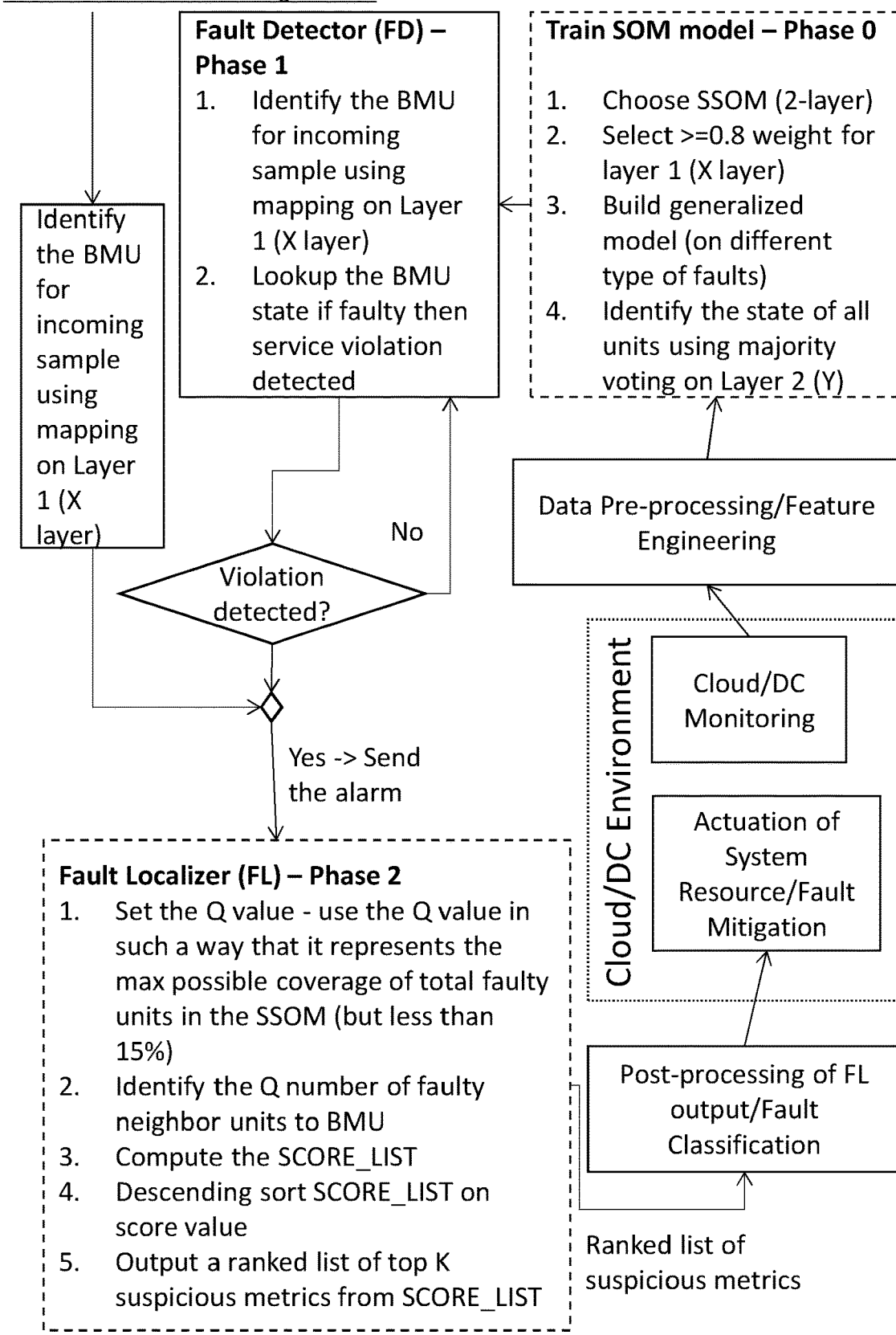
FIG. 5 is another flowchart illustrating embodiments of the method in the fault localization system.
Figure 12:
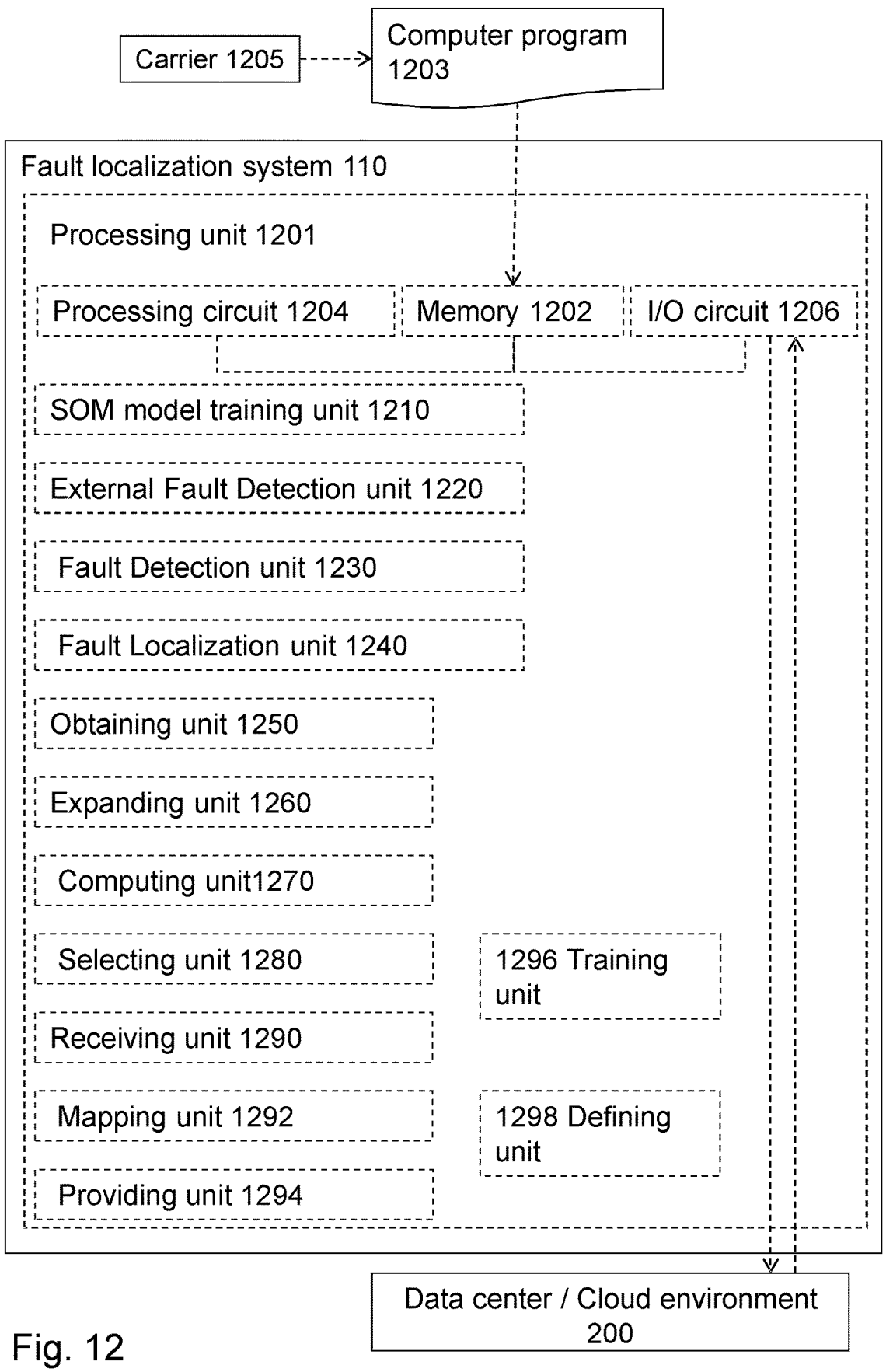
FIG. 12 is a block diagram illustrating embodiments of the fault localization system.

A preferred embodiment of the method is shown in FIG. 5 by a flow chart but also described in detail in the following sections with details of the method herein. FIG. 12 illustrates a Fault localization system configured to execute the method described below.

Note that in the flowchart if an alarm is generated from an external source it is necessary to find the BMU before the FL is invoked.

When doing service assurance for the applications running in the DC/Cloud environment there are two major parts to the analysis. One is the fault detection—to find out or predict if a fault has occurred in the system. Second part is to execute the fault localization process once a fault has been detected in the system. The SOMs based ML approach is used to implement both the fault detection and localization process. One pre-phase in this case is to actually build the ML model (SOM model in this case in a specific way) which then can be used for the above two tasks.

The method works as follows:

Phase 0—Training

Before using an ML model for predictions and localization it has to be trained. For SOM models, it may first be needed to choose the right topology (e.g., square maps, hexagonal maps, torus etc.). Then, secondly, the right topology size may need to be selected. For example, the square maps are selected, then the size of the map should be selected. In an evaluated use case, an 20×20 square map seems to be suitable. Larger maps take more time for training while smaller map might result in degraded accuracy.

In traditional SOMs (1-layer SOMs) each unit has an associated weight vector. Before the training process starts these weight vectors associated with each unit are randomly initialized. During the training a competitive learning process is used for SOMs where each training sample has to be mapped to exactly one of the units in the map (called BMU (best matching unit)). BMU is usually selected based on certain distance criteria (e.g., Euclidian distance) and each training sample is then mapped to the unit which has closest distance to currently trained sample. After the mapping process BMU and its neighboring cells associated weight vectors has to be updated based on a specific learning rate. This allows the BMUs and neighbor units (weight vectors) to adapt over time with the data. This process of training the SOMs is repeated over several iterations until mean distance of the mapped samples to the SOM has converged to the minimum. These are also called unsupervised SOMs because to train 1-layer SOM one may need to have only the X data to train without having the access the Y data (i.e., labels).

In Supervised SOMs (SSOM) (2-layer SOMs) general process is the same but there are 2 layers which are connected to each other. That is a weight value is associated with each layer and when mapping the input weight vectors (from sample training data)—a weighted sum of distances (to each layer) is considered during the competitive learning process (i.e., mapping of the input data to different cells). 2-layer SOMs are referred to as SSOMs, because not only X data can be mapped to layer 1 but also Y data (labels) are mapped to layer 2 during the training phase of the SOMs.

In the described method, the SSOMs are used to make use of the Y data as well during the training phase.

Furthermore, all the data, e.g. including data from normal time instances as well as data from abnormal time instances, is used.

Much higher weight values (i.e., >0.8) for the X layer are used. This is mainly because weight vectors which are mapped on the X layer have many more elements as compared to data mapped on the Y layer. Following this guideline can significantly increase the performance of the trained model (when used during phase 1 and phase 2) which are discussed afterwards.

As mentioned, all the training data with all different type of faults is used to train one general purpose SOM map. This can improve the performance (in Phase 1 and 2). In addition, this is also much simpler instead of trying to build/update specialized SOM maps for each type of fault.

Finally, the state of the different units residing on the different coordinates in the map may need to be established. For this each unit at the X layer the corresponding unit at the Y layer is consulted and the state is then determined based on majority voting of the Y labels residing on that coordinates on Layer 2 unit.

Phase 0 may be similar to action 4010 and/or action 4020 above.

Phase 1—Fault Detection

After training SSOM and establishing the state of different units in the Phase 0 the fault detection phase starts.

During the fault detection phase a new test sample with input vector I (i1, i2, . . . in) is mapped to a SOM unit (BMU with vector W (w1, w2, . . . wn)) based on a distance measure (typically Euclidean distance) similar to how it is done during the competitive learning during the training phase. However, the state of different units has already been established during Phase 0. If a faulty state is detected for the current BMU then:

a. An SLA violation is detected at a time instance T by the FD b. An alarm is sent to the Fault Localizer (FL) with the performance metric statistics at the current time instance T c. If an alarm filtering mechanism is implemented then it maybe that an alarm is sent to FL only after a certain number of consecutive SLA violations have been detected in a certain time-period.

Phase 1 may be similar to one or more of actions 4030 to 4080 above.

Phase 2—Fault Localization In the fault localization, the difference between the normal neighboring units and currently identified faulty unit (from Phase 1) is observed, and output the metrics that differ most as faulty (suspicious) metrics.

Specifically, when an input sample vector is mapped to a faulty unit, the Euclidean distance may be calculated. The Euclidean distance may be taken from the mapped faulty unit to a set of nearby normal units (i.e., neighboring units representing normal states) in a radius r. If not enough normal units are found in the faulty unit's neighborhood, the radius may be expanded, e.g. increased, to include more units in the map. In order to ensure that a good representation of normal metrics in neighborhood is achieved, it may be required to select a fraction of Q normal nearby units. Once a set of normal units has been found, an absolute difference between the individual metric values of each normal unit and those of the faulty units are computed. Then, the average value, also called score, is computed by dividing the sum of these individual metric values with Q. Top k (k=3 in this case) number of metrics sorted on the score value are then output as suspicious metrics for the time instance (i.e., localized list of suspicious metrics).

Suppose input vector is I ($i_1$, $i_2$, . . . $i_n$). and let $N_1$, $N_2$, . . . $N_Q$ represent the weight vectors associated with the Q normal neighbors where each neighbor cell weight vector Np has associated weight vectors component ($N_{P,1}$, $N_{P,2}$, . . . $N_{P,n}$).

1. Compute score list S for metrics:
   $S(S_1, S_2, . . . , S_n) = (1/Q)*(abs(I-N_1) + . . . + abs(I-N_2) + . . . + abs(I-N_Q))$
2. decend_sort(S)
3. Suspicious Metric List (SML):=Pick Top k metrics from S The Q value, defined as a fraction of the number of normal nodes, may be used in such a way that it represents the maximum coverage (but not greater than 15%) of total units in the SOM map. For example if a map of 20×20 is used (400 units) then a Q value of around 0.15, which corresponds to 60 units, may be selected for improved, e.g. optimal, performance on the fault localization.

Phase 2 may be similar to one or more of actions 4090 to 4120 above.

Pseudo code for describing the actions from methods in Phase 0, 1 and 2 is shown in below. The actions may include the Training, Fault Detection (FD) and Fault Localization (FL) methods.

---

Training SSOM, based on X = metrics for resources, Y = SLA classes
   General map including many types of faults
   0.8 weight for X layer
   20 x 20 SSOM
   Q = 15%
   Majority voting on X layer
   Loop for every sample:
Two cases for Fault Triggering:
   1. Fault Detection (FD) by SSOM
      § Identify BMU for incoming sample, based on X
      § If BMU state == faulty (Fault Predicted)
          Perform FL (below)
   2. External Fault Detection (XFD)
      § If detected SLA violation from other mechanism, e.g. user or other FP
         Identify BMU for incoming sample, based on X
         If BMU state is Normal
            Search for faulty unit in the nearest surrounding of the BMU
         If BMU or unit in nearest surrounding is faulty
            Perform FL (below)
Fault Localization (FL)
   Find Q normal neighbors
      § Start with radius = 1
      § while ((fraction of normal neighbors < Q)&&( SSOM map is not fully searched):
         radius++
         update normal neighbors count
   Calculate score list S
      § For each component j of the input vector I and the Q neighbors with NQ weight vectors
         $S_j = Avg(|I_j - N_j|) = sum(|I_j - N_j|) / Q$
   Sort score list S
   Select the k top metrics as the suspected root causes

---

Figure 6:
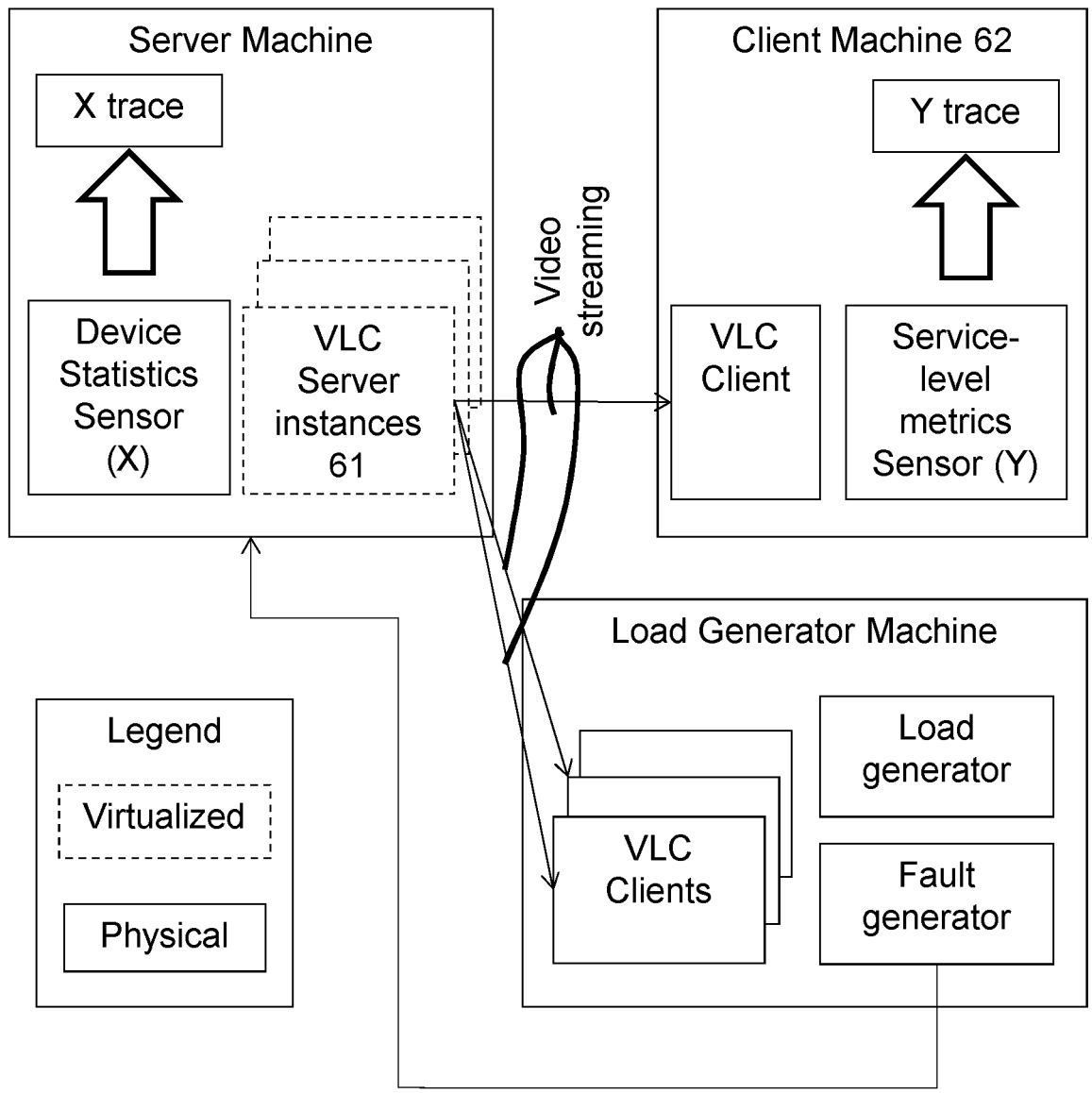
FIG. 6 is an overview of an experimental testbed using container based virtualization.

FIG. 6 shows a testbed where the method disclosed above has been evaluated. The testbed consists of a set of servers 61 that executes a video-on-demand service. The client machines 62 receive the video streaming enabled through the servers.

Specifically, a video-on-demand service (VoD) has been tested and it was tried to predict, on the server side, whether the agreed service quality on the client side is violated or not (i.e., a binary classification problem). The service quality is dictated by a service level agreement, SLA, signed by the provider and the user. Predicting the SLA is an important tool for delivering high-quality services. The provider can take timely and faster actions based on predictive analysis compared to traditional customer support services. But this becomes even more useful when coupled with analytics based automated fault localization to diagnose the detected faults. This would have required significantly more effort including human intervention involving more money and time otherwise.

Figure 7:
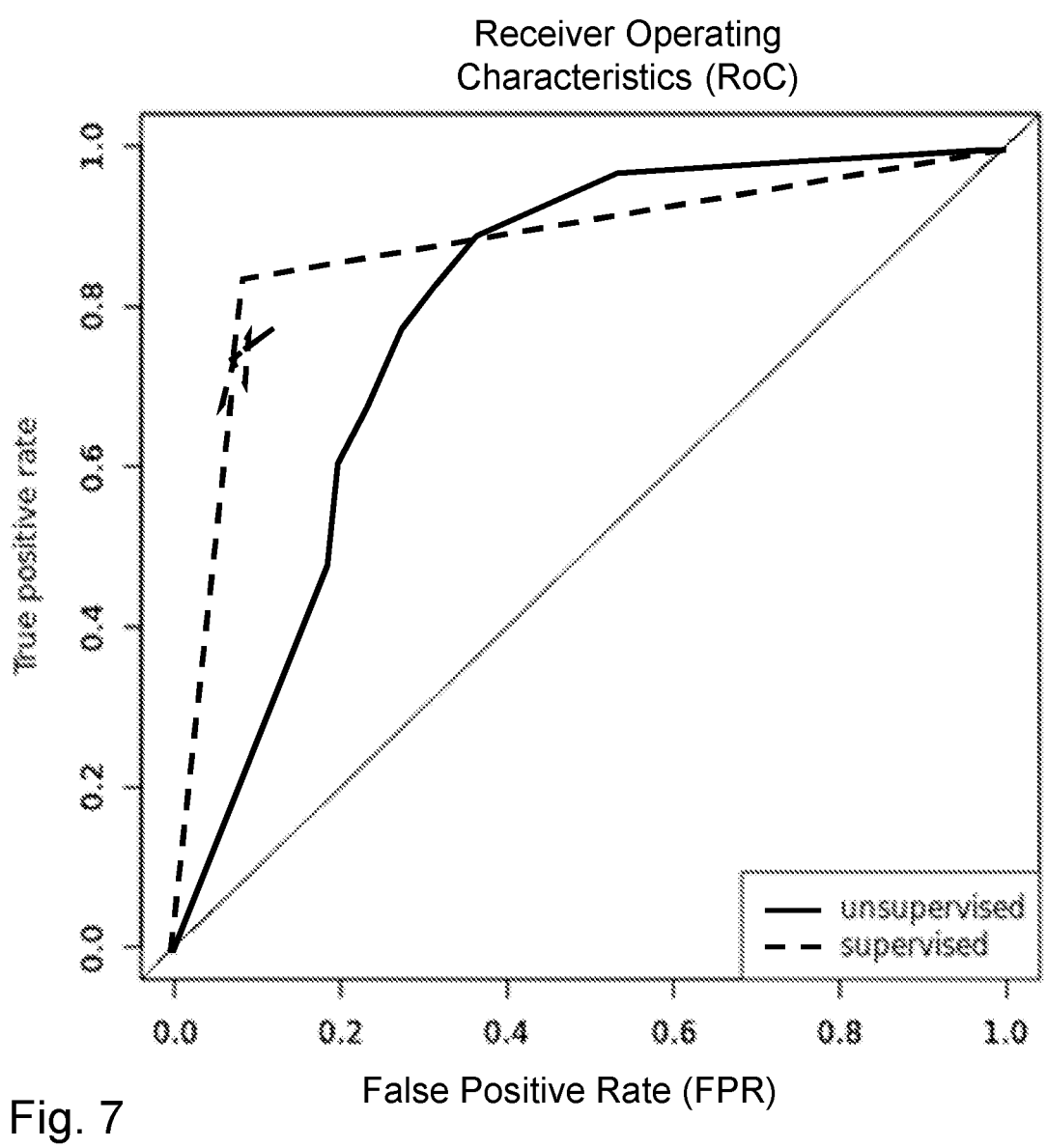
FIG. 7 is diagram illustrating true positive rate as a function of false positive rate.

FIG. 7 shows that FD module implemented based on the SSOM techniques has much higher classification accuracy as compared to the traditional (1-layer SOMSs). In particular, quite good True Positive Rate (TPR) can be achieved by experiencing only a small False Positive Rate (FPR).

Figure 8:
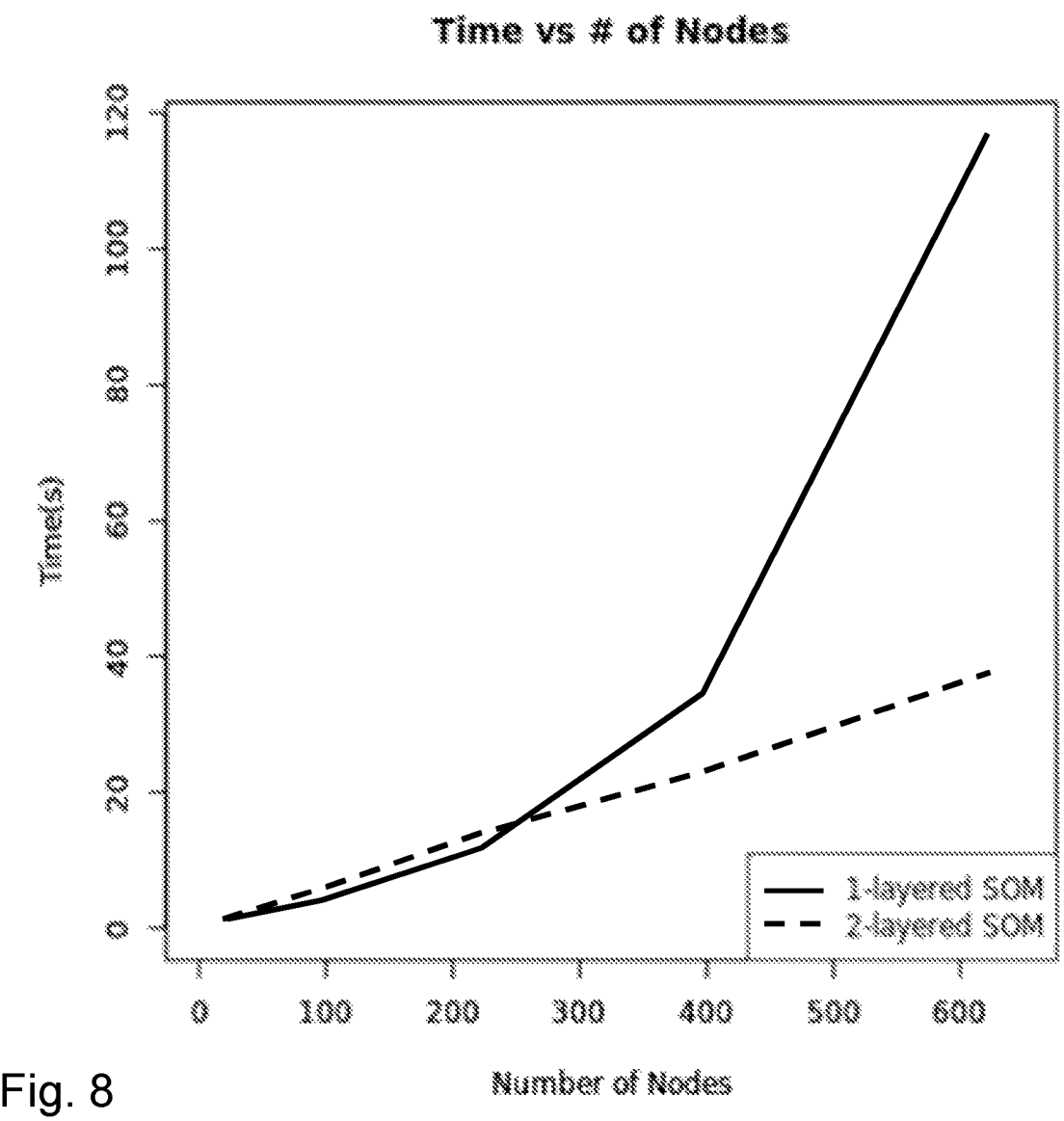
FIG. 8 is another diagram illustrating a graph of time vs. number of nodes.

FIG. 8 shows that time complexity (training time) of ML model for FD is also much faster in contrast to case when 1-layer SOM is used.

Figure 9:
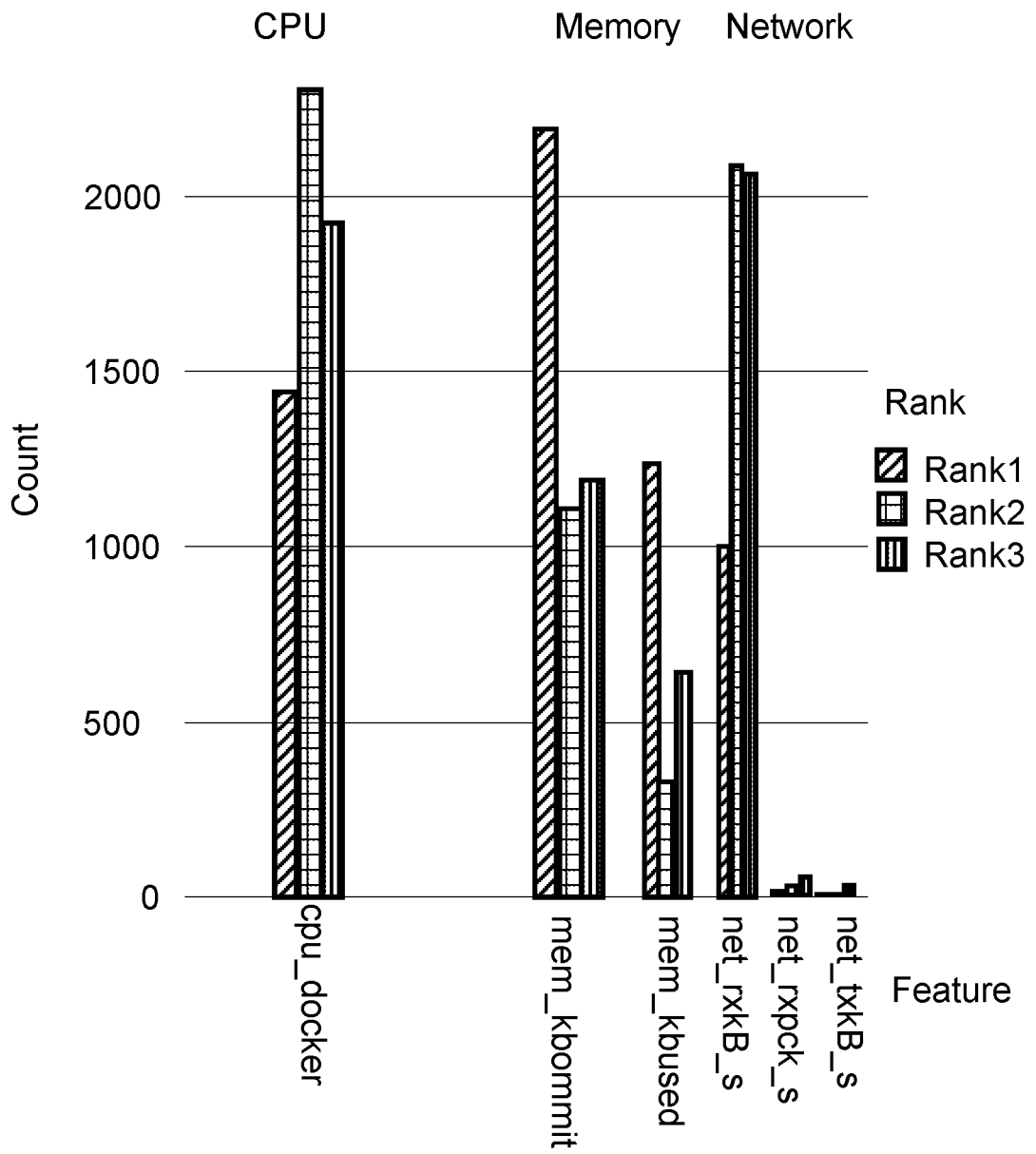
FIG. 9 is an illustration of accuracy for memory faults.
Figure 10:
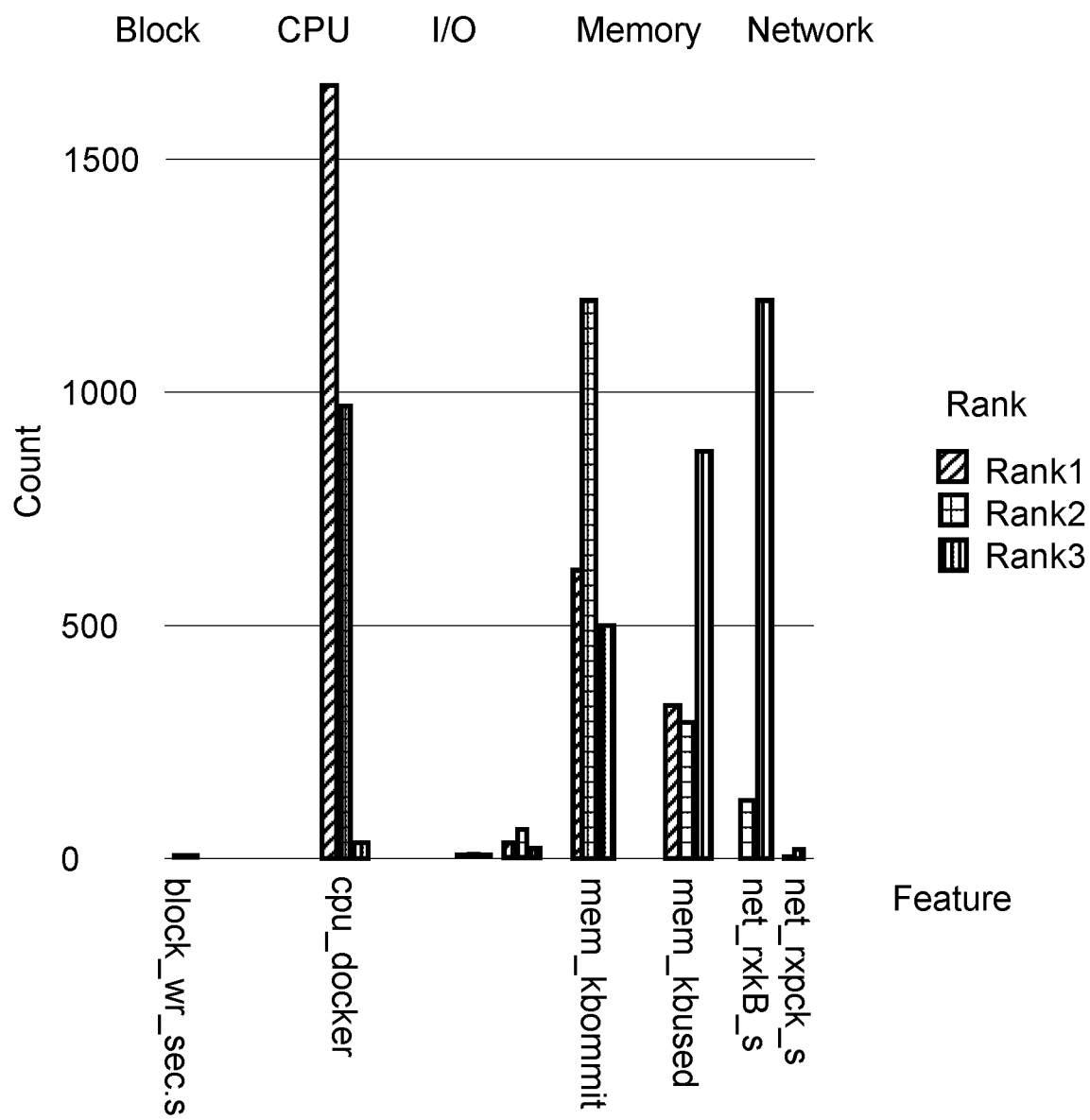
FIG. 10 is another illustration of CPU faults.
Figure 11:
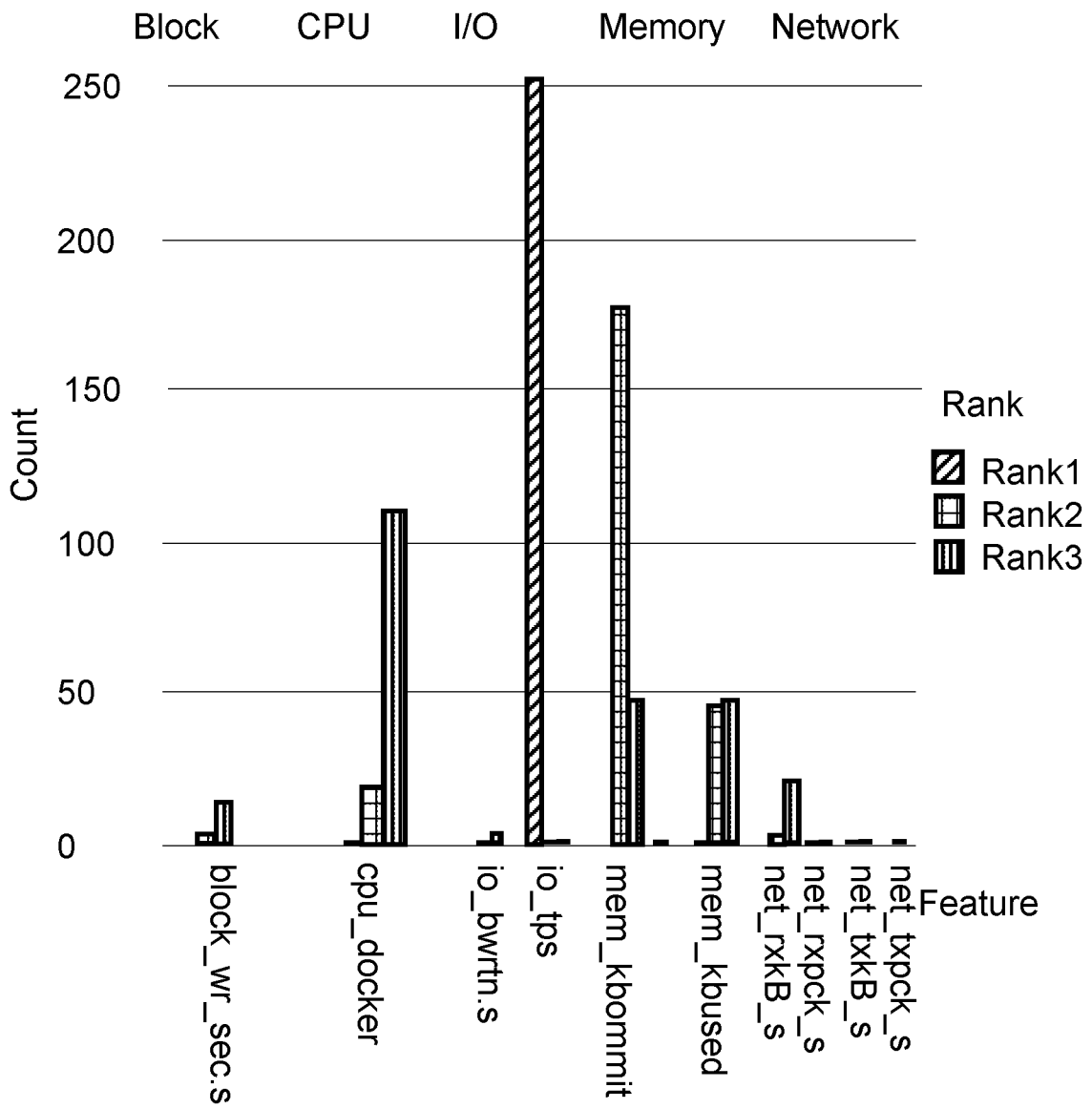
FIG. 11 is a further illustration of I/O faults.

FIG. 9, FIG. 10 and FIG. 11 show that very high fault localization accuracy can be achieved when memory, CPU hogging and I/O faults are injected in the system (host layer). And that was possible while training a single generalized SSOM using data traces infested with the different type of faults. In this case value of k is set to 3. In general, in this case SSOMs with 20×20 size squared topology performs very well while keeping the training time to a couple of minutes for training data >20k samples. Also for fault detection close to 80% BA (Balanced Accuracy) can be achieved that's pretty good considering highly skewed data distribution (only ~10% of the samples in the data represent SLA violated state).

In more detail, FIG. 9 shows memory fault, using a non-specialized map (2-layered), in which there are 20×20 nodes in the map. Rank1 for memory is among the highest. Therefore, it may be concluded that the fault is in the memory, i.e. a certain memory feature. In this case, the certain memory feature is mem_kbcommit, which is the amount of memory in kilobytes needed for current workload. The Figure illustrates fault occurrences per feature, which achieves a location accuracy (loc. acc.) of 0.992. Prediction accuracy shows that Classification Accuracy (CA) is 0.882 and that BA is 0.827. The Figure illustrates fault localization (& detection) accuracy on injected memory faults.

In more detail, FIG. 10 shows CPU fault, using a non-specialized map (2-layered), in which there are 20×20 nodes in the map. Rank1 for cpu is among the highest. Therefore, it may be concluded that the fault is in the cpu, i.e. a certain cpu feature. In this case, the certain cpu feature is cpu_docker, which is the amount of CPU used by the Docker system. The Figure illustrates fault occurrences per feature, which achieves a location accuracy (loc. acc.) of 0.997. Prediction accuracy shows that CA is 0.921 and that BA is 0.785. The Figure illustrates fault localization (& detection) accuracy on injected CPU hogging faults.

In more detail, FIG. 11 shows I/O fault, using a non-specialized map (2-layered), in which there are 20×20 nodes in the map. Rrank1 for I/O is among the highest. Therefore, it may be concluded that the fault is in the I/O, i.e. a certain I/O feature. In this case, the certain I/O feature is io_tps, which is the number of I/O transfers per second. The Figure illustrates fault occurrences per feature, which achieves a location accuracy (loc. acc.) of 1. Prediction accuracy shows that CA is 0.893 and that BA is 0.767. The Figure illustrates fault localization (& detection) accuracy on injected I/O faults.

In FIGS. 9-11, the features may be any types of server-related metrics, e.g. related to CPU, memory, network and I/O usage. For example, block_rd_sec.s, block_wr_sec.s, cpu_all, cpu_docker, io_bread.s, io_bwrthn.s, io_tps, mem_kbcommit, mem_kbswpused, mem_kbused, net_rxkB.s, net_rxpck.s, net_txkB.s, net_txpck.s or the like.

FIG. 12 illustrates in a block diagram the fault localization system 110 connectable to a data center/cloud environment, such as the system 200. The fault localization system 110 comprises a SOM training unit 1210 configured to train the SOM model. It further comprises an external fault detection unit 1220 configured to detect fault and a fault detection (FD) unit 1230 and a fault localization unit 1240 that is configured to localize the fault as described above. The term "unit" may also refer to a module of the aforementioned types.

The fault localization system 110 may comprise a processing unit 1201, such as a means for performing the methods described herein. The means may be embodied in the form of one or more hardware units and/or one or more software units. The term "unit" may thus refer to a circuit, a software block or the like according to various embodiments as described below.

The fault localization system 110 may further comprise a memory 1202. The memory may comprise, such as contain or store, instructions, e.g. in the form of a computer program 1203, which may comprise computer readable code units. Therefore, FIG. 12 also illustrates the computer program 1203 which when executed on the fault localization system 110 causes the fault localization system 110 and related units to execute the method described above including the steps of training, fault detection and fault localization.

According to some embodiments herein, the fault localization system 110 and/or the processing unit 1201 comprises a processing circuit 1204 as an exemplifying hardware unit, which may comprise one or more processors. Accordingly, the processing unit 1201 may be embodied in the form of, or 'realized by', the processing circuit 1204. The instructions may be executable by the processing circuit 1204, whereby the fault localization system 110 is operative to perform the methods of FIG. 4 and/or FIG. 5. As another example, the instructions, when executed by the fault localization system 110 and/or the processing circuit 1204, may cause the fault localization system 110 to perform the method according to FIG. 4 and/or FIG. 5.

In view of the above, in one example, there is provided a fault localization system 110 for predicting a location of a fault in the computer system 200. Again, the memory 1202 contains the instructions executable by said processing circuit 1204 whereby the fault localization system 110 is operative for:

obtaining a faulty unit pertaining to a SSOM, wherein the faulty unit has been derived from a sample of machine-level metrics relating to the computer system 200, wherein the SSOM has been trained with a first layer X of machine-level metrics and a second layer Y of service-level metrics, wherein the trained SSOM includes at least one faulty unit and at least one normal unit, expanding a radius of a circle originating at the faulty unit until a predefined number Q of normal units of the SSOM falls within the circle, computing, for each machine-level metric, a respective score based on differences between the faulty unit and the predefined number Q of normal units, wherein a set of scores comprises the respective score for each machine-level metric, and selecting a sub-set of the set of scores, wherein the sub-set comprises a number k among the greatest scores of the set of scores, whereby the location of the fault is predicted to be located to one or more machine-level metrics represented by the sub-set of scores.

FIG. 12 further illustrates a carrier 1205, or program carrier, which comprises the computer program 1203 as described directly above. The carrier 1205 may be one of an electronic signal, an optical signal, a radio signal and a computer readable medium.

In some embodiments, the fault localization system 110 and/or the processing unit 1201 may comprise one or more of an obtaining unit 1250, an expanding unit 1260, a computing unit 1270, a selecting unit 1280, a receiving unit 1290, a mapping unit 1292, a providing unit 1294, a training unit 1296 and a defining unit 1298 as exemplifying hardware units. The term "unit", or module, may refer to a circuit when the term "unit" refers to a hardware unit. In other examples, one or more of the aforementioned exemplifying hardware units may be implemented as one or more software units.

Moreover, the fault localization system 110 and/or the processing unit 1201 comprises an Input/Output circuit 1206, which may be exemplified by the receiving unit and/or the sending unit when applicable.

Accordingly, the fault localization system 110 configured for predicting a location of a fault in a computer system 200.

Therefore, according to the various embodiments described above, the fault localization system 110 and/or the processing unit 1201 and/or the obtaining unit 1250 is configured for obtaining a faulty unit pertaining to a SSOM. The faulty unit has been derived from a sample of machine-level metrics relating to the computer system 200. The SSOM has been trained with a first layer X of machine-level metrics and a second layer Y of service-level metrics. The trained SSOM includes at least one faulty unit and at least one normal unit.

The fault localization system 110 and/or the processing unit 1201 and/or the expanding unit 1260 is configured for expanding a radius of a circle originating at the faulty unit until a predefined number Q of normal units of the SSOM falls within the circle.

The fault localization system 110 and/or the processing unit 1201 and/or the computing unit 1270 is configured for computing, for each machine-level metric, a respective score based on differences between the faulty unit and the predefined number Q of normal units. A set of scores comprises the respective score for each machine-level metric.

The fault localization system 110 and/or the processing unit 1201 and/or the selecting unit 1280 is configured for selecting a sub-set of the set of scores. The sub-set comprises a number k among the greatest scores of the set of scores, whereby the location of the fault is predicted to be located to one or more machine-level metrics represented by the sub-set of scores.

The fault localization system 110 and/or the processing unit 1201 and/or the receiving unit 1290 may be configured for receiving the sample of machine-level metrics relating to the computer system 200.

The fault localization system 110 and/or the processing unit 1201 and/or the mapping unit 1292 may be configured for mapping the sample to an initial unit of the SSOM.

The fault localization system 110 and/or the processing unit 1201 and/or the providing unit 1294 may be configured for providing the initial unit as the faulty unit, when a state of the initial unit indicates a fault.

The fault localization system 110 and/or the processing unit 1201 and/or the receiving unit 1290 may be configured for receiving an alarm relating to degradation of at least one of the service-level metrics.

The fault localization system 110 and/or the processing unit 1201 and/or the receiving unit 1290 may be configured for receiving the sample of machine-level metrics relating to the computer system, the sample being associated with the alarm.

The fault localization system 110 and/or the processing unit 1201 and/or the mapping unit 1292 may be configured for mapping 4050 the sample to an initial unit of the SSOM.

The fault localization system 110 and/or the processing unit 1201 and/or the providing unit 1294 may be configured for providing the initial unit as the faulty unit, when a state of the initial unit indicates a fault.

The fault localization system 110 and/or the processing unit 1201 and/or the mapping unit 1292 may be configured for mapping the sample to further units being in a nearest surrounding of the initial unit, when the state of the initial unit indicates a normal state.

The fault localization system 110 and/or the processing unit 1201 and/or the provding unit 1294 may be configured for providing said one of the further units as the faulty unit, when the state of one of the further units indicates a fault.

The fault localization system 110 and/or the processing unit 1201 and/or the training unit 1296 may be configured for training the SSOM with the first layer X of machine-level metrics and the second layer Y of service-level metrics.

The fault localization system 110 and/or the processing unit 1201 and/or the defining unit 1298 may be configured for defining a respective state of each unit of the SSOM as faulty or normal using majority voting on the second layer Y of service-level metrics. The respective state of said at least one faulty unit is faulty and the respective state of said at least one normal unit is normal.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines. In case of a cloud system, the term "node" may refer to a virtual machine, such as a container, virtual runtime environment or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a Dynamic Link Library (DLL), a software component, a software object, an object according to Component Object Model (COM), a software function, a software engine, an executable binary software file or the like.

The terms "processing unit" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a fault localization system, for predicting a location of a fault in a computer system that connects a client to a set of servers, wherein the fault localization system is connected to the computer system to monitor and collect data for localizing the fault and wherein the fault localization system comprises a processing circuit and a memory, the memory containing instructions which, when executed by the processing circuit, cause the fault localization system to perform the method comprising:
   obtaining a faulty unit pertaining to a Supervised Self-Organizing Map (SSOM), wherein the faulty unit has been derived from a sample of machine-level metrics relating to the computer system, wherein the SSOM has been trained based on machine learning with a first layer of machine-level metrics and a second layer of service-level metrics, wherein the trained SSOM includes at least one faulty unit and at least one normal unit;
   expanding a radius of a circle originating at the faulty unit until a predefined number of normal units of the SSOM falls within the circle;
   computing, for each machine-level metric, a respective score based on differences between the faulty unit and the predefined number of normal units, wherein a set of scores comprises the respective score for each machine-level metric;
   selecting a sub-set of the set of scores, wherein the sub-set comprises a number among the greatest scores of the set of scores, whereby the location of the fault is predicted to be located to one or more machine-level metrics represented by the sub-set of scores; and
   activating mitigation of the fault based on the predicted location.

2. The method according to claim 1, wherein the method further comprises:
   receiving the sample of machine-level metrics relating to the computer system;
   mapping the sample to an initial unit of the SSOM; and
   when a state of the initial unit indicates a fault, providing the initial unit as the faulty unit.

3. The method according to claim 1, wherein the method further comprises:
   receiving an alarm relating to degradation of at least one of the service-level metrics;
   receiving the sample of machine-level metrics relating to the computer system, the sample being associated with the alarm; and
   mapping the sample to an initial unit of the SSOM.

4. The method according to claim 3, wherein the method further comprises:
   when a state of the initial unit indicates a fault, providing the initial unit as the faulty unit.

5. The method according to claim 3, wherein the method further comprises:
   when a state of the initial unit indicates a normal state, mapping the sample to further units being in a nearest surrounding of the initial unit.

6. The method according to claim 5, wherein the method further comprises:
   when a state of one of the further units indicates a fault, providing said one of the further units as the faulty unit.

7. The method according to claim 1, wherein the method further comprises:

training the SSOM with the first layer of machine-level metrics and the second layer of service-level metrics; and defining a respective state of each unit of the SSOM as faulty or normal using majority voting on the second layer of service-level metrics, wherein the respective state of said at least one faulty unit is faulty and the respective state of said at least one normal unit is normal.

8. A fault localization system to predict a location of a fault in a computer system that connects a client to a set of servers, wherein the fault localization system is configured to connect to the computer system to monitor and collect data for localizing the fault and wherein the fault localization system comprising:

a processing circuit; and a memory containing instructions which, when executed by the processing circuit, cause the fault localization system to:

obtain a faulty unit pertaining to a Supervised Self-Organizing Map (SSOM), wherein the faulty unit has been derived from a sample of machine-level metrics relating to the computer system, wherein the SSOM has been trained based on machine learning with a first layer of machine-level metrics and a second layer of service-level metrics, wherein the trained SSOM includes at least one faulty unit and at least one normal unit;

expand a radius of a circle originating at the faulty unit until a predefined number of normal units of the SSOM falls within the circle;

compute, for each machine-level metric, a respective score based on differences between the faulty unit and the predefined number of normal units, wherein a set of scores comprises the respective score for each machine-level metric;

select a sub-set of the set of scores, wherein the sub-set comprises a number among the greatest scores of the set of scores, whereby the location of the fault is predicted to be located to one or more machine-level metrics represented by the sub-set of scores; and activate mitigation of the fault based on the predicted location.

9. The fault localization system according to claim 8, wherein the fault localization system is further configured to:

receive the sample of machine-level metrics relating to the computer system;

map the sample to an initial unit of the SSOM; and when a state of the initial unit indicates a fault, provide the initial unit as the faulty unit.

10. The fault localization system according to claim 8, wherein the fault localization system is further configured to:

receive an alarm relating to degradation of at least one of the service-level metrics;

receive the sample of machine-level metrics relating to the computer system, the sample being associated with the alarm; and map the sample to an initial unit of the SSOM.

11. The fault localization system according to claim 10, wherein the fault localization system is further configured to:

when a state of the initial unit indicates a fault, provide the initial unit as the faulty unit.

12. The fault localization system according to claim 10, wherein the fault localization system is further configured to:

when a state of the initial unit indicates a normal state, mapping the sample to further units being in a nearest surrounding of the initial unit.

13. The fault localization system according to claim 12, wherein the fault localization system is further configured to:

when a state of one of the further units indicates a fault, providing said one of the further units as the faulty unit.

14. The fault localization system according to claim 8, wherein the fault localization system is further configured to:

train the SSOM with the first layer of machine-level metrics and the second layer of service-level metrics; and define a respective state of each unit of the SSOM as faulty or normal using majority voting on the second layer of service-level metrics, wherein the respective state of said at least one faulty unit is faulty and the respective state of said at least one normal unit is normal.

15. A non-transitory machine-readable storage medium that provides instructions that, when executed by a processor of a device for fault localization in a network, cause the device to monitor and collect data to perform operations to predict a location of a fault in a computer system that connects a client to a set of servers in the network comprising:

obtaining a faulty unit pertaining to a Supervised Self-Organizing Map (SSOM), wherein the faulty unit has been derived from a sample of machine-level metrics relating to the computer system, wherein the SSOM has been trained based on machine learning with a first layer of machine-level metrics and a second layer of service-level metrics, wherein the trained SSOM includes at least one faulty unit and at least one normal unit;

expanding a radius of a circle originating at the faulty unit until a predefined number of normal units of the SSOM falls within the circle;

computing, for each machine-level metric, a respective score based on differences between the faulty unit and the predefined number of normal units, wherein a set of scores comprises the respective score for each machine-level metric;

selecting a sub-set of the set of scores, wherein the sub-set comprises a number among the greatest scores of the set of scores, whereby the location of the fault is predicted to be located to one or more machine-level metrics represented by the sub-set of scores; and activating mitigation of the fault based on the predicted location.

16. The non-transitory machine-readable storage medium of claim 15, wherein the operations further comprise:

receiving the sample of machine-level metrics relating to the computer system;

mapping the sample to an initial unit of the SSOM; and when a state of the initial unit indicates a fault, providing the initial unit as the faulty unit.

17. The non-transitory machine-readable storage medium of claim 15, wherein the operations further comprise:

receiving an alarm relating to degradation of at least one of the service-level metrics;

receiving the sample of machine-level metrics relating to the computer system, the sample being associated with the alarm; and mapping the sample to an initial unit of the SSOM.

18. The non-transitory machine-readable storage medium of claim 17, wherein the operations further comprise:

when a state of the initial unit indicates a fault, providing the initial unit as the faulty unit.

19. The non-transitory machine-readable storage medium of claim 17, wherein the operations further comprise:

when a state of the initial unit indicates a normal state, mapping the sample to further units being in a nearest surrounding of the initial unit; and when a state of one of the further units indicates a fault, providing said one of the further units as the faulty unit.

20. The non-transitory machine-readable storage medium of claim 15, wherein the operations further comprise:

training the SSOM with the first layer of machine-level metrics and the second layer of service-level metrics; and defining a respective state of each unit of the SSOM as faulty or normal using majority voting on the second layer of service-level metrics, wherein the respective state of said at least one faulty unit is faulty and the respective state of said at least one normal unit is normal.

* * * * *